(12) United States Patent
Guo (10) Patent No.: US 11,906,674 B2
(45) Date of Patent: Feb. 20, 2024

(54) SEALABLE, MESOPOROUS SILICA SHELL NANOREACTOR

(71) Applicant: The Regents of the University of California, Oakland, CA (US)

(72) Inventor: Ting Guo, Davis, CA (US)

(73) Assignee: REGENTS OF THE UNIVERSITY OF CALIFORNIA, Oakland, CA (US)

( * ) Notice: Subject to any disclaimer, the term of this patent is extended or adjusted under 35 U.S.C. 154(b) by 357 days.

(21) Appl. No.: 17/192,674

(22) Filed: Mar. 4, 2021

(65) Prior Publication Data

US 2021/0382187 A1 Dec. 9, 2021

Related U.S. Application Data

(63) Continuation of application No. PCT/US2019/048472, filed on Aug. 28, 2019.

(60) Provisional application No. 62/728,560, filed on Sep. 7, 2018.

(51) Int. Cl.
| | | |
|---|---|---|
| *G01N 33/00* | (2006.01) | |
| *G01T 1/04* | (2006.01) | |
| *C01B 33/18* | (2006.01) | |
| *B82Y 40/00* | (2011.01) | |

(52) U.S. Cl.
CPC ............... *G01T 1/04* (2013.01); *C01B 33/18* (2013.01); *B82Y 40/00* (2013.01); *C01P 2004/34* (2013.01); *C01P 2004/64* (2013.01); *C01P 2006/16* (2013.01)

(58) Field of Classification Search
CPC ........... A61K 49/0093; A61K 51/1244; G01N 33/574; G01N 33/54346; G01N 33/587; G01N 33/582; G01N 33/60; G01N 23/223; G01N 33/552; A61P 35/00; B82Y 40/00; C01B 33/18; G01T 1/04
See application file for complete search history.

(56) References Cited

U.S. PATENT DOCUMENTS

| | | |
|---|---|---|
| 4,132,560 A | 1/1979 | Marquisee et al. |
| 9,604,955 B2 | 3/2017 | Guo |

FOREIGN PATENT DOCUMENTS

| | | | |
|---|---|---|---|
| CN | 107281220 A | | 10/2017 |
| JP | 2009196829 A | | 9/2009 |
| JP | 2016516729 A | * | 9/2016 |
| WO | 2017/127759 A1 | | 7/2017 |
| WO | 2020/051032 A1 | | 3/2020 |

OTHER PUBLICATIONS

Cui, et al., "Corrosion Resistance of Layer-By-Layer Assembled Polyvinylpyrrolidone/Polyacrylic Acid and Amorphous Silica Films on AZ31 Magnesium Alloys", RCS Advances, vol. 6, 2016, pp. 63107-63116.
Peck, et al., "Sealable Spherical Mesoporous Silica Shell Nanoreactors as Fiducial Nanoscale Probes for X-rays", The Journal of Physical Chemistry, vol. 122, No. 43, Oct. 7, 2018, pp. 8686-8692.

\* cited by examiner

*Primary Examiner* — Don K Wong
(74) *Attorney, Agent, or Firm* — Kilpatrick Townsend & Stockton LLP (57) ABSTRACT

The present technology relates to nanomaterials and methods of their use, and more specifically to methods and structures using nanomaterials to fiducially measure radiation dosing.

20 Claims, 6 Drawing Sheets

FIG. 8

SEALABLE, MESOPOROUS SILICA SHELL NANOREACTOR

CROSS-REFERENCE TO RELATED APPLICATIONS

This application is a continuation of International Application No. PCT/US2019/048472, filed Aug. 28, 2019, which claims the benefit of priority to U.S. Provisional Patent Application No. 62/728,560, filed Sep. 7, 2018, the contents of which are hereby incorporated by reference in their entirety for all purposes.

FIELD

The present technology relates to nanomaterials and methods of their use. More specifically, the present technology relates to methods and structures using nanomaterials to fiducially measure radiation dosing.

BACKGROUND

As X-rays become increasingly more popular in driving or activating chemical reactions in the presence of nanomaterials,[1-2] there is an urgent need to develop chemical species, such as nanoscale dosimeters, that can fiducially determine the dose of X-rays or other radiation sources without interference from nanomaterials and other chemically active components. In traditional chemistry, chemical probes are often mixed intimately with other chemical species in a chemical environment. For example, coumarin 3-carboxylic acid (3-CCA) molecules may be dissolved in water to determine the dose of X-rays.[3] 3-CCA molecules can be used to measure the dose because 3-CCA molecules react with hydroxyl radicals produced by X-ray irradiation of water to form highly fluorescent 7-hydroxy 3-CCA (7-OHCCA).

When ethanol, a hydroxyl radical scavenger, is added to the solution the response has to be recalibrated. The new mixture can also be used to measure dose, albeit using the new calibrated dose response curve that may account for the loss. In another instance, when fluorescence-based molecules such as 3-CCA are used to determine the dose of X-rays in the presence of certain small gold nanoparticles, there could be increased production of the fluorescent 7-OHCCA product due to a catalytic effect even though the amount of gold is insignificant.[4-5] Hence a pre-condition for being able to serve as probes to measure the dose is that there cannot be any significant interference from the environment such as catalysis, scavenging, or inhibition, which if present but unknown, can lead to distorted results and incorrect conclusions. In conventional studies, the cause for the increase of the product was attributed to several factors, including the catalytic properties of the gold nanoparticles, the nanoscale energy deposition around the nanoparticles,[6-8] and even the water layers surrounding the surface of the nanoparticles.[9] However, all of these claims were speculations, inferred indirectly from the dose measurement results using probing reactions. This problem is well-manifested in the new discipline of X-ray nanochemistry, which often employs the measurement of dose enhancement factor to determine the merit of nanomaterials.[1] It is therefore important to develop dosimetric measurements that can fiducially report the dose of X-rays in the presence of these nanomaterials or other chemicals such as radical scavengers.

Several possibilities exist to resolve the problem. One possibility is to incorporate 3-CCA in solid mesoporous particles, which can host some molecules similar to 3-CCA.[10-11] With the mesoporous particles, chemical species can move through the pores, allowing reactions to occur.[10] However, the pore capacity may be limited, and in the 3-CCA dose measurement case, there may be no response, as shown in this work. Another possibility to avoid the interference is to make nanoscale probes so that the probing dosimetric reactions are securely stored inside and are shielded chemically from the outside. A close example is calcium phosphate enclosed liposomes (CaPELs).[8,12] The reaction inside CaPELs is damage to fluorescent sulphorhodamine B (SRB), a molecule that is not typically used as a dosimetric reaction. This nanoscale probe, nonetheless, can measure the dose. The problem with using CaPELs is that they are built using liposomes, and many probing molecules such as 3-CCA cannot diffuse through the lipid walls before calcium phosphate (CaP) sealing. Another limitation is that the size of CaPELs is dictated by that of liposomes, which is in a narrow range of 50 to 200 nm. In addition, CaPELs are relatively difficult to synthesize. These restrictions therefore call for new types of nanoscale dosimeters, sharing the name with the general definition of nanoreactors,[13-14] so that probing molecules can be stored inside and the reactions are shielded from the outside.

DESCRIPTION OF THE FIGURES

FIG. 1A (A) shows the solid mesoporous silica nanoparticles. Pores are visible in the inset. FIG. 1A (B) shows the etched mesoporous silica shells. Pores again are clearly seen in the inset. FIG. 1A (C) shows the (solid) amorphous silica (no pores) sealed mesoporous silica shells filled with 3-CCA (aq). The bars in the figures are 100 nm and the bars in the insets are 25 nm.

FIG. 1B (A) shows the image of cubic silica cores. FIG. 1B (B) presents the results of core-shell $mSiO_2@mSiO_2$ where the internal layer is more porous than the outer layer. Growth of a denser mesoporous silica layer on the outside of the silica cubes shown in Scheme 1. Here, the particles are coated using 1000 μL of TEOS to precipitate the external silica layer which increases the particle size. The external silica layer is designated by the arrows in FIG. 1B (B) and yields an uneven surface due to particle deposition. FIGS. 1B (C), 1B (D), and 1B (E) show the etched cubic shells. The outer layers were grown with 100 μL, 50 μL; and 1000 μL TEOS solution, respectively. FIG. 1B (F) shows etching of solid cubes without the second layer of silica as shown in FIG. 1B (C).

FIG. 1C (A) shows large gold nanoparticles synthesized from small gold nanoparticle seeds. FIG. 1C (B) shows small gold nanoparticles within nanoreactors according to the present technology after incubation. FIGS. 1C (C), 1C (D), and 1C(E) show cubic nanoreactors containing large gold nanoparticles grown from the gold nanoparticle seeds.

FIG. 1D (A) shows gold nanorods. FIG. 1D (B) shows the formation of a silica shell formed about the gold nanorods. FIG. 1D (C) shows partially etched gold nanorods within a silica shell. FIG. 1D (D) shows cylindrical nanoreactors according to embodiments of the present technology. FIG. 1D (E) shows gold nanostructures in shells after etching of different conditions including treatment, etchant concentration, and etch time. Silica nanoshell nanoreactors are shown in the top right panel.

FIG. 2 illustrates the data processing protocol employed in this work. A) shows the raw signal from a nanoreactor sample after 25 Gy of X-ray irradiation (solid grey line), the water Raman scattering signal (dotted black line), and signal after removing the water Raman scattering signal (solid purple line). B) indicates the signal (solid black line) after subtracting silica scattering intensity using Origin Pro8.5 and the final processed signal (solid blue line) after subtracting the signal from an non-irradiated sample (dashed black line).

FIG. 3A shows fluorescence from 7-OHCCA from nanoreactors and their supernatant after each centrifugation purification. In total, 12 purifications were conducted. Fluorescence signal in the nanoreactors persists after 12 purifications, at which time there is no fluorescence in the supernatant. FIG. 3B shows three samples of different doses at 100 Gy (purple), 200 Gy (blue), 300 Gy (black) 20 mM (incubated concentration) 3-CCA (aq) in sealed solid mesoporous silica nanoparticles. All three samples present similar, low signals, indicating no or little 7-OHCCA produced in this case.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Introduction

The present disclosure relates to methods of producing nanoreactors containing probing molecules, nanoreactor structures, and methods of irradiating probing molecules within a nanoreactor. The nanoreactors may provide a controlled environment that may be sealed from an external environment, which may include catalytic materials and scavenging materials. Fluorescent molecules produced from irradiated probing molecules may provide a fiducial measurement capability of irradiation dosing.

The present disclosure is based, at least in part, on Applicants' use of molecular reactions as dosimetric probes. A challenge in conventional techniques with using these aqueous reactions to determine the dose of ionizing radiation, however, has been that other species, such as nanoparticles or other chemicals, either purposely or accidentally placed in solution often interfere with the reactions. The results measured in the presence of nanomaterials and scavengers therefore cannot be correctly interpreted based on the calibrated results free of the interfering species. Applicants have determined that storing these molecular probes in nanoreactors can overcome this problem. Applicants have demonstrated that it is possible to place typical probe molecules inside spherical hollow mesoporous silica shells and seal the pores after impregnation for the purpose of using the so-formed nanoreactors as X-ray dose probes. The reactions may be isolated from the external environment while the sealed shells still allow X-rays to freely penetrate through the walls of the nanoreactors. These nanoreactor probes can therefore fiducially report the dose of X-rays whether the nanoreactors are in solutions, in dry form, or in the presence of scavengers and catalysts in solution.

A potentially useful extension of nanoscale probes beyond CaPELs, with the benefits of correcting the drawbacks mentioned above, is sealable hollow mesoporous silica shells. These shells can be as small as below 50 nm in diameter and as large as microns. The wall thickness ranges from 10 to 100 nm. Their preparations have been reported by many groups.[15-18] However, to date there have been no reports of incorporating 3-CCA or similar probing molecules in the shells for performing dose measurement reactions. As a result, no previous work has been done in terms of producing nanoreactors specifically for X-ray dose measurement that can meet all the requirements mentioned above, and it has been heretofore unknown whether it is possible to place these probing molecules in the shells and whether the response can be significant and linear to measure the dose.

The present technology proves that 3-CCA molecules may be physically trapped in sealable hollow mesoporous silica nanoreactors and upon X-ray irradiation, these molecules can react with hydroxyl radicals produced by X-ray ionization of water trapped inside to form fluorescent 7-OHCCA molecules. As a result, the nanoreactor may be used to measure X-ray dose from the produced molecules. The nanoreactor seal may be strong enough to maintain the content in the shell intact and shield it from the external environment. Additionally, the sealing operates in the presence of probing molecules. The nanoreactor therefore may be configured to chemically isolate the internal environment from the external environment.

The measurement can be performed when the produced nanoreactors are in dry form, in solution, as well as in the presence of other materials, which would otherwise compromise the measurements. For example, in some embodiments the measurements may be performed in the presence of small gold nanoparticles and even in high concentrations of reactive oxygen species ("ROS") scavengers, such as 50 wt % ethanol. In some embodiments, the dose measurements were calibrated to be linearly responsive within the measured dose range. It was found that these nanoreactors can fiducially determine the dose of X-rays, proving that these shells do not scavenge ROS in the measured dose range, making nanoreactors according to embodiments of the present technology ideal for measurements of dose. The nanoreactors may also aid isolation and identification of various processes such as chemical enhancement established in the new discipline of X-ray nanochemistry, which may study ways of increasing the effectiveness of X-rays through the use of nanoscience and nanotechnology.[1, 19]

Beyond the composition of the nanoreactor walls, the present technology further provides nanoreactors characterized by a number of shapes. Spherically, cubically, and cylindrically shaped nanoreactors may be developed by a number of different processes, which may produce hollow shells as well as reactors incorporating nanoparticles. Providing additional shapes may advantageously improve anchoring and other delivery mechanisms. For example, it is possible to securely and selectively anchor cubic nanoparticles on flat substrates relative to spherical shells. Multiple methods of developing nanoreactors are presented based on the core-shell strategy, and any of these methods may be used to develop spherical, cubic, or cylindrical nanoreactors, as well as other geometries of nanoreactors. For example, nanoreactors may be developed from particles of a single composition without clear structural differences throughout the whole particle, which then contains both the shell and the core. The core, even though not defined at the end of the synthesis, may be slightly different structurally at the end of aging, although of the same chemical composition as the shell. The core may then be removed as the result of etching, leaving behind the shell as the exterior of the nanoreactors.

Additionally, core-shell materials may be produced where the core and shell compositions differ from one another. For example, the core may be structurally different from the shell, such as, for example, slightly less dense. In some embodiments the composition may be the same for both components, such as mesoporous silica as will be described below. The structural differences between the core and shell may enable etching of the sacrificial core templates after they are coated with a shell material. Core-shell materials may also be used where the two materials differ elementally, with the core being a sacrificial material. The core may then be etched after the shell is coated onto the core material, leaving the exterior of the nanoreactor remaining.

Definitions

Unless specifically indicated otherwise, all technical and scientific terms used herein have the same meaning as commonly understood by those of ordinary skill in the art to which this technology belongs. In addition, any method or material similar or equivalent to a method or material described herein can be used in the practice of the present technology. For purposes of the present technology, the following terms and phrases are defined.

The terms "a," "an," or "the" as used herein not only include aspects with one member, but also include aspects with more than one member. For instance, the singular forms "a," "an," and "the" include plural referents unless the context clearly dictates otherwise.

"Chemical Enhancement" or "CE" may refer to further catalytic modifications by nanomaterials in addition to physical enhancements. Chemical enhancement may utilize reactive oxygen species generated in a surrounding medium, such as water, for example, and thus to cause chemical enhancement, the nanomaterials may absorb X-rays less strongly than the absorption to produce physical enhancement.

"Type 1 Physical Enhancement" or "T1PE" may refer to released photoelectrons from an absorbing material on a nanoparticle after absorption of primary X-ray photons. The released photoelectrons may be energetic enough to travel micrometers or tens of micrometers in a surrounding media, such as water, for example.

"Type 2 Physical Enhancement" or "T2PE" may refer to released low-energy photoelectrons (<5 keV) and secondary electrons generated by absorption of primary X-ray photons. These electrons can generate greater densities of energy deposition about the absorbing materials due to the shorter distances they travel in a surrounding media, such as water, for example.

As used herein, the symbol "@" may identify particles positioned inside of other particles. For example, "A@B" may identify that "A" is disposed within or incorporated within "B." The material of "B" may be positioned or coupled as a shell or coating about the material of "A", and may be a complete or incomplete shell or coating in embodiments.

Experimental Methods

Materials used in examples according to the present technology may include a number of materials. Coumarin 3-carboxylic acid (3-CCA, 99%), polyvinylpyrrolidone (PVP, average MW 29 kDa), hexadecyltrimethylammonium bromide (CTAB, ≥96%), and anhydrous ethanol (EtOH, 200 proof) were purchased from Sigma Aldrich. Tetrethyl orthosilicate (TEOS, 98%) was purchased from Acros Organics. Ammonium hydroxide (28 wt %) and sodium phosphate monobasic, monohydrate ($NaH_2PO_4 \cdot H_2O$) were purchased from EMD millipore corporation. Ammonium nitrate and sodium phosphate dibasic heptahydrate ($Na_2HPO_4 \cdot 7H_2O$) were purchased from Fisher Scientific. Milli-Q Millipore water (MQ, 18.2 MΩ $cm^{-1}$) was used in all experiments. Hexane (anhydrous 95%, Sigma Aldrich), ethanol (200 proof anhydrous, Koptec), Gold (III) chloride (99.99% trace metals basis, 30% wt. in dilute HCl, Sigma Aldrich), sodium citrate tribasic dehydrate (ACS reagent ≥99.0%, Sigma Aldrich), coumarin-3-carboxylic acid (3-CCA) (99% Sigma Aldrich), sulforhodamine B (SRB) (97%, ACROS Organics), hydroquinone (MP Biomedicals LLC), sodium phosphate monobasic, monohydrate (ACS Grade, EMD), sodium phosphate dibasic heptahydrate (Fisher Scientific) were directly used for synthesis of the cubic nanoreactors without further purification or modification.

Spherical Shell Nanoreactors

Hollow mesoporous silica shells ($hmSiO_2S$) were produced as nanoreactors for the present technology. It is to be understood that spherical shell nanoreactors may also be prepared via any of the methods further described below. The silica shells were prepared by following a modified version of an existing method.[15] First, 27 mL water, 12.4 mL ethanol, 130 µL ammonium hydroxide solution (28 wt %), and 80 mg CTAB was mixed for 30 minutes. Then, 550 µL of TEOS was added to the mixture dropwise to form solid mesoporous silica particles. After 24 hours, the particles were spun and purified three times with 35 mL ethanol. The purified particles were re-dispersed with 5 mL ethanol, where 4 mL of the mixture was added to 200 mL water and etched at 70° C. for 4 hours. The product was then purified three times with ethanol. The surfactant CTAB template was extracted with 10 mg/mL ammonium nitrate ethanol solution by boiling the purified product in 100 mL solution for 3 hours. The hollow mesoporous silica shells were purified once with water and 3 times with ethanol after extracting CTAB. Lastly, the shells were dried at 60° C.

Pellets of hmSiO$_2$@PVP@aSiO$_2$ were also produced that were incubated with 3-CCA, although additional probing molecules may be used and may include other coumarin-containing materials, other benzopyrones, lactones, or other materials which may produce fluorescent particles when reacted with hydroxide. Initially, 20 mM 3-CCA solution was prepared in 80 mM equimolar phosphate buffer by dissolving 102.6 mg of 3-CCA in 30 mL water in presence of 149.04 mg NaH$_2$PO$_4$·H$_2$O and 289.44 mg Na$_2$HPO$_4$·7H$_2$O. The solution was gently heated and stirred in a sealed flask until dissolution. After cooling, 6 mg of hmSiO$_2$ was mixed with 30 mL of 20 mM 3-CCA for 12 hours in the dark. Next, 1 mL of PVP (0.2 wt %) was added to the mixture and gently stirred for 12 hours. In some embodiments a different water-soluble polymeric material may be used instead of or in addition to PVP. The solution was then purified once at 2,500 rpm for 10 minutes and supernatant was removed. The pellet was redispersed in 10 mM phosphate buffer (30 mL) and the pH was adjusted with ammonium hydroxide solution (28 wt %) until the pH was in the range of 9.5-10.3. 250 µL of TEOS was then added to the mixture dropwise. The solution was gently stirred for 12 hours in the dark. Lastly, the product was purified seven times at 2,500 rpm for 10 minutes with 10 mM phosphate buffer. After the final purification, the pellet was dried.

Testing was performed on produced particles of hmSiO$_2$@PVP@sSiO$_2$ incubated with 3-CCA using X-ray irradiation in the presence of a number of additional materials including scavengers and tetrakis(hydroxymethyl) phosphonium chloride (THPC) gold nanoparticles (AuNP). Irradiation samples were prepared by weighing out 0.5 mg of dried product into a PCR tube using a Kevex/Thermos, PXS10-WB source (100 kVp, 250 uA). Varying doses were delivered to the sample, in the range of 0-400 Gy. Scavenging tests were performed by mixing 0.5 mg dried product with 20 µL of ethanol (200 and 100 proof). A control of 20 µL 3-CCA in solution mixed with ethanol (200 and 100 proof) was irradiation at a dose of 100 Gy. Samples of 0.5 mg dried product were also irradiation at 100 Gy in the presence of 20 µL of 3 nm THPC AuNP (10, 50, 100 ppm). Additionally, 0.5 mg dried product were spiked with THPC AuNP (10, 50, 100 ppm) after irradiation to serve as control samples. After irradiation all the samples were diluted with water and measured under fluorescence.

Fluorescence signals of the resulting solutions were measured at an excitation wavelength of 395 nm and emission wavelength of 440 nm using a Horiba FluoroMax-P. A calibration curve was carried out to determine the yield of 7-hydroxycoumarin-3-carboxylic acid (7-OHCCA) within the sealed hollow mesoporous silica shells in experimental samples All fluorescence measurements were processed using an Origin Pro 8.5 to subtract the background due to silica scattering.

Determinations were made of the extent of 3-CCA adhesion to the silica. The solid mesoporous silica was prepared similarly as described above. An amorphous silica coating was also produced about the shells. The success of coating was determined and confirmed using TEM. The resulting amorphous silica coated solid mesoporous silica nanoparticles (mSiO$_2$@aSiO$_2$) were used to determine an extent of 3-CCA sticking. The degree of 3-CCA sticking to the silica was determined as follows: the 6-times purified mSiO$_2$@aSiO$_2$ was dissolved in 30 µL 80 mM phosphate buffer (PB) and irradiated under 0, 100, 200, and 300 Gy and 100 kVp X-ray and the fluorescence measured after two-fold dilution in Milli-Q water to obtain 60 µL 40 mM PB solution.

All samples were prepared for TEM testing by drop-casting a nanoparticle ethanol solution (~1 mg/5 mL) onto 300 mesh lacey carbon copper grids. The suspensions were allowed ample drying time of one hour. TEM images were taken using the Talos L120C microscope and JEOL 1230 operating at 100 kV.

Cubic Shell Nanoreactors

Cubic mesoporous silica (mSiO$_2$) shells were produced according to the present technology. The cubic shells may be substantially cubic in some embodiments, such as due to rounded corners, or slightly varying dimensions about the shell, while still generally forming cubes. Cubic nanoreactors according to some embodiments of the present technology may be made similarly to the methods described for the spherical shell nanoreactors, as well as methods described below for cylindrical nanoreactors. Initially, mSiO$_2$ cubes were synthesized according to a published procedure.[14] First, 0.5 g of CTAB, 80 mL of Milli-Q water, and 3.5 mL of ammonium hydroxide (28% wt.) were mixed and stirred at 35° C. for 2 hours. A combination of 10 mL n-hexane and 2.5 mL TEOS was then added dropwise over 15 minutes into the solution while stirring. The entire mixture was continuously stirred at 35° C. for 16 hours. The synthesized solid silica nanoparticle suspension was centrifuged to separate the white precipitate. The sample was consecutively rinsed first with Milli-Q water and then ethanol 3 times, each rinse followed with centrifugation at 6500 rpm for 5 minutes. The final product was dried in air and a white solid powder was obtained.

The external mesoporous silica layer on the mSiO$_2$ cube was prepared as core-shells (mSiO$_2$@mSiO$_2$) according to the Stober method.[20] solution mixture was initially prepared by combining 23.8 g of ethanol and 3.33 g of Milli-Q water. Next, 50 mg of dried mSiO$_2$ cubes was suspended via sonication in the solution mixture. 525 µL of NH$_4$OH was added to the mixture as the base catalyst for the reaction. Depending on the silica shell thickness, 50 µL, 100 µL, or 1000 µL of TEOS were added to the suspension while stirring at room temperature. The resulting mixtures were then stirred for 14 hours at room temperature. The final solutions had a more intense white color, indicating the precipitation of additional silica material onto the cubic cores. The contents were centrifuged at 6500 rpm for 5 minutes to separate the silica nanoparticles from the reaction solution. The solid white products were purified twice with Milli-Q water and twice with ethanol, with centrifugation at 6500 rpm for 5 minutes. The collected white silica particles were heated at 50° C. until dry.

Preparing cubic hollow mSiO$_2$ shells involved a thermal etching of the products obtained from the above procedures. In a glass flask, 25 mg of mSiO$_2$@mSiO$_2$ prepared above was suspended in 50 mL of Milli-Q water. 60 nm, 75 nm and 100 nm thick shells were prepared by heating and stirring the samples made from using 50 µL, 100 µL, or 1000 µL of TEOS at 65° C. for 5, 8 and 12 hours, respectively. Each suspension became less opaque over time, indicating a decrease in silica content present. The flask contents were then cooled down followed by centrifugation at 6500 rpm for 5 minutes to separate the hollowed silica cubes from water. The pellets were rinsed with Milli-Q water under the same centrifugation conditions, and the products were the nanoreactors in the form of cubic hollow silica particles.

Incubation of small molecules into the cubic shells was also performed. A solution of 3-CCA was prepared by adding 38 mg of 3-CCA, 55.2 mg of monobasic sodium phosphate and 107.2 g of dibasic sodium phosphate into 10 mL of Milli-Q water. The mixture was stirred in solution at 35° C. for 45 minutes in which the resulting mixture yielded a 20 mM 3-CCA solution in PBS solution at a pH of ~8. 3-CCA or SRB molecules were similarly incubated into the shells, which were sealed during incubation. Approximately 1 mg of the cubic shells were dispersed in the Stober modified solution that eventually contained 2.41 g of ethanol, 333 µL of Milli-Q water, 100 µL of TEOS, 150 µL of 20-mM 3-CCA or 10 mM SRB in water, and 52.4 µL of $NH_4OH$. The entire solution was magnetically stirred at room temperature for 14 hours. Final products were separated from the supernatant via centrifugation at 6500 rpm for 5 minutes, and eight centrifugations, each rinsed with 2 mL of Milli-Q water, were performed to obtain the final products of 3-CCA or SRB containing sealed nanoreactors.

Gold nanoparticles were also synthesized and seeded into nanoreactors where they were further synthesized into large gold nanoparticles. The synthesis of gold nanoparticle (AuNP) seeds were identical to those reported earlier.[21] Stable particles of approximately 7 to 8 nm in size were attained at room temperature. Cubic shells containing AuNP seeds were prepared via incubation. First, 0.1 g of the nanoreactors were dispersed in 50 g of Milli-Q water. Next, 4 mL of AuNP seed solution were added into the hollow silica cubes suspension and stirred for 3 hours at room temperature. Cubic shells containing AuNPs were separated from solution through centrifugation at 6500 rpm for 5 minutes. An external mesoporous silica layer was coated onto 50 mg AuNPs containing cubic shells via dispersing into 23.8 g ethanol, 3.33 g Milli-Q water, 525 µL $NH_4OH$ via sonication. Then 200 µL TEOS was added dropwise into the mixture which was stirred for 14 hours at room temperature. The resulting product was purified twice in water and twice in ethanol, centrifuging at 6500 rpm for 5 minutes each time. This sample was dried in air at room temperature. For the growth of large AuNPs inside the shells, the sample was dispersed and stirred in a mixture that contained 20 g of Milli-Q water and 5 µL of gold (III) trichloride solution for 1 hour. 250 µL of 1 wt. % sodium citrate was injected into the suspension and stirred for 30 minutes. 500 µL of 3 mM hydroquinone was injected into the solution at a rate of 50 µL per 10 minutes. The sample was rinsed with Milli-Q water three times and then centrifuged at 6500 rpm for 5 minutes after each rinse.

Transmission electron microscopy (TEM) (Talos L120C, Thermo Scientific) operated at 80 kV was used to inspect the nanomaterials synthesized in this example. Sample preparation involved dispersing silica nanoparticles in pure ethanol. At least three microliters of the suspension were dropcasted onto Lacey carbon coated copper grids followed by drying in air at room temperature. The samples were measured using dynamic light scattering (DLS) (Zetasizer Nano-series, Nano-S90). Approximately 0.02 grams of the silica nanoparticle samples were dispersed in pure ethanol and transferred into a disposable plastic cuvette for measurement at room temperature. X-ray irradiation experiments were conducted using a Kevex X-ray source (Thermo Fisher Scientific) with a tungsten target. A 50 sample of 3-CCA incubated silica nanoreactors was suspended in Milli-Q water via sonication and injected into an Eppendorf tube. This entire sample was irradiated for 30 minutes with an X-ray dose rate of approximately 5 Gy/min. In order to measure fluorescence on the Fluoromax instrument, a 50 µL X-ray irradiated sample was mixed with 450 µL of Milli-Q water and transferred to a quartz cuvette.

Cylindrical Shell Nanoreactor

Cylindrical shell nanoreactors were also produced according to embodiments of the present technology. The shells may be considered substantially cylindrical, such as due to rounding of corners or ends, as well as non-uniform diameter along the shell. Again, it is to be understood that any of the previous methods may similarly be performed to produce cylindrical shell nanoreactors according to some embodiments of the present technology. Initially, gold nanorods (AuNR) were synthesized according to a published procedure.[22] AuNRs in water were purified via centrifugation at 6,000 rpm for 30 minutes. The pellets were redispersed in 60 mL of 1.6 mM CTAB and stirred for 15 minutes. The pH of the CTAB-AuNRs was adjusted to the range of 10.5-11 using 0.1 M sodium hydroxide (approx. 600 After stirring the mixture for 15 minutes, 20% TEOS in methanol was added dropwise via three additions of 180 µL for the first three hours. The solution was stirred at room temperature for two days, and finally purified via centrifugation at 5,5000 rpm for 20 minutes and redispersed in methanol.

Etching according to some embodiments of the present technology may be performed in multiple ways based on heat treatment vessels. Depending on the shape of the containers in which the heat treatment is performed, the longitudinal surface plasmonic resonance (LSPR) peak wavelength may be shifted to longer or shorter wavelengths. For example, a blue-shift may be performed with smaller vessels. Etching experiments were done at equivalent 100 ppm for Au ions or 0.1 nM AuNPs in methanol. In a scintillation vial, which may include any number of small vessels such as beakers, test tubes, or other small volume vessels characterized by volumes of less than or about 15 mL, less than or about 10 mL, or less, 5 mL of AuNR@$mSiO_2$ were heated at 62° C. for 20 minutes in a water bath. The solution was cooled for ten minutes to room temperature. 10 mM KCN addition was injected via a pipet, initializing the etching process. Etching was monitored visually and solution color changed from red into colorless within 30 seconds after addition of KCN.

A red-shift may similarly be performed with larger vessels, such as those characterized by a volume greater than or about 15 mL, greater than or about 20 mL, or greater. Etching experiments were done at equivalent 100 ppm for Au ions or 0.1 nM AuNPs in methanol. In a 25 mL boiling flask, 5 mL of AuNR@$mSiO_2$ were heated at 62° C. for 20 minutes in a water bath. The solution was cooled for ten minutes to room temperature. 10 mM KCN addition was injected via a pipet, initializing the etching process. Etching was monitored visually. At regular intervals, such as greater than or about 5 minute intervals, greater than or about 10 minute intervals, greater than or about 15 minute intervals, greater than or about 20 minute intervals, greater than or about 25 minute intervals, greater than or about 30 minute intervals, or greater, 100 µL was withdrawn from the solution and immediately injected into 500 µL of methanol in an Eppendorf tube, followed by centrifugation at 4,000 rpm, for 5 min. The etching process continued until LSPR peak under UV-Vis was no longer detectable, which may extend for greater than or about 30 minutes, greater than or about 1 hour, greater than or about 2 hours, greater than or about 3 hours, greater than or about 4 hours, greater than or about 5 hours, greater than or about 6 hours, or more.

Results

Figure 1A:
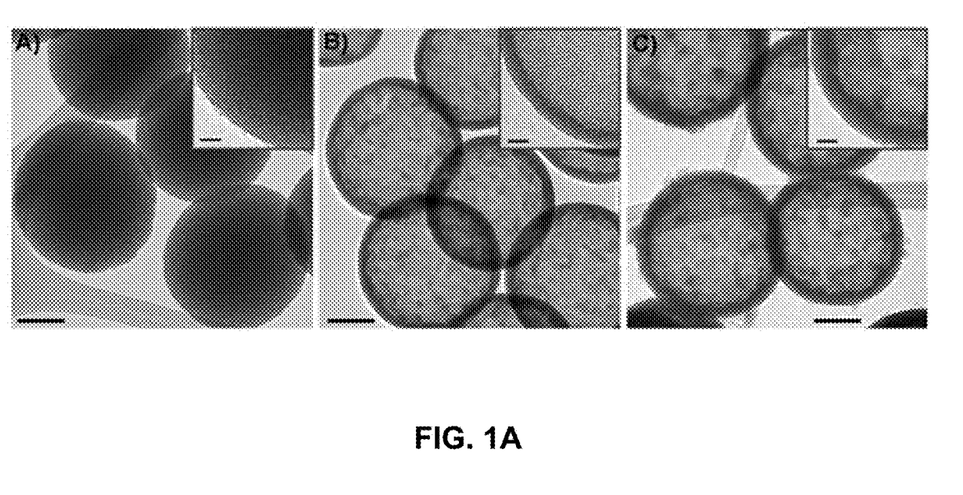
FIG. 1A illustrates TEM images of solid mesoporous silica nanoparticles, etched hollow mesoporous silica shells, and amorphous silica sealed hollow mesoporous silica shells with 3-CCA (aq) inside.
Figure 1B:
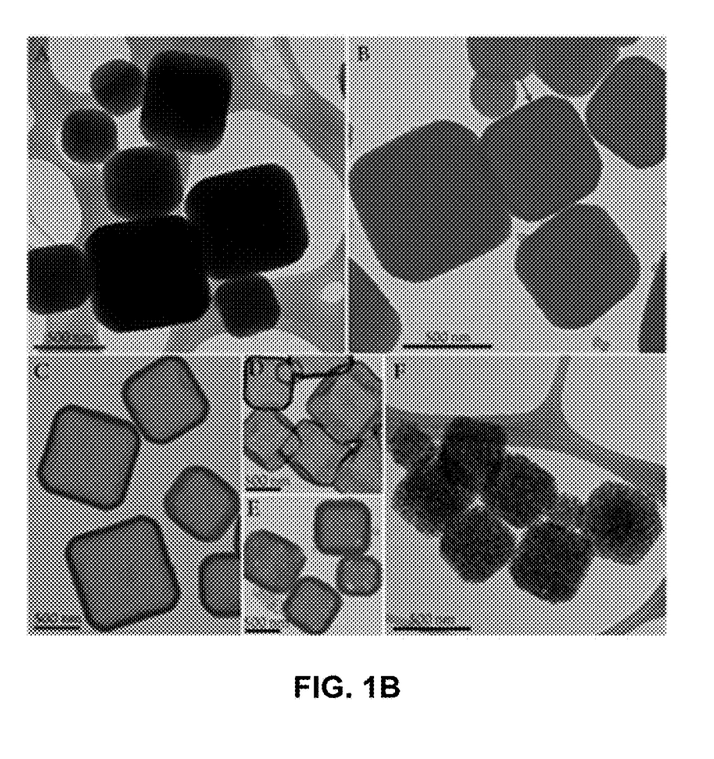
FIG. 1B illustrates TEM images of the growth of hollow mesoporous silica ($hmSiO_2$) according to embodiments of the present technology.
Figure 1C:
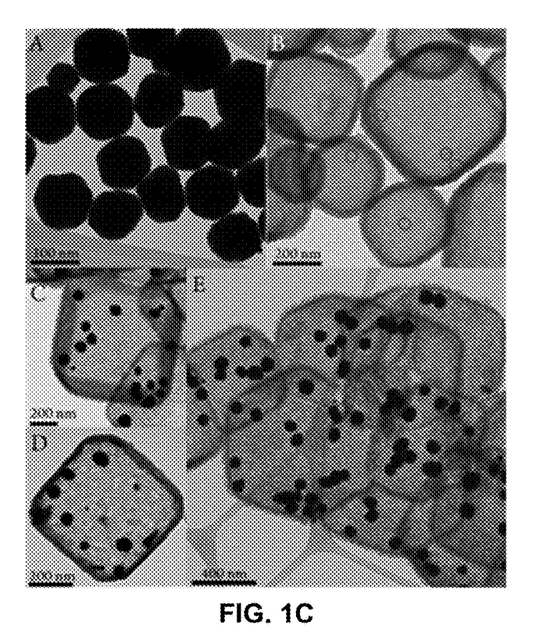
FIG. 1C illustrates TEM images of the synthesis of gold nanoparticles inside nanoreactors.

The hollow silica nanoreactors were made, incubated with 3-CCA, and sealed to produce nanoreactors according to some embodiments of the present technology. FIGS. 1A-1C illustrates the results. The as-made solid silica mesoporous nanoparticles initially formed and prior to water etching (FIG. 1A (A)), silica nanoshells after etching (FIG. 1A (B)), and amorphous silica layer-coated hollow mesoporous silica nanoshells (FIG. 1A (C)) were imaged with TEM, the results of which are displayed. The pores in the mesoporous silica nanoshells (FIG. 1A (B)) are visible prior to sealing with the coating. The amorphous silica sealant layer can be seen filling the pore structure (FIG. 1A (C)). The average size of the nanoreactors is 304±21 nm (outer diameter), and the thickness of the shells is 20±2 nm. In some embodiments of the present technology, the polymeric material, such as PVP, may seal substantially all of the pores of the nanoreactor, which may maintain the probing molecules isolated or substantially isolated from the external environment. For example, the polymeric material may seal at least about 50% of the pores, at least about 75% of the pores, at least about 90% of the pores, at least about 95% of the pores, at least about 98% of the pores, at least about 99% of the pores, at least about 99.99% of the pores, or may essentially or completely seal the pores in some embodiments.

Figure 2:
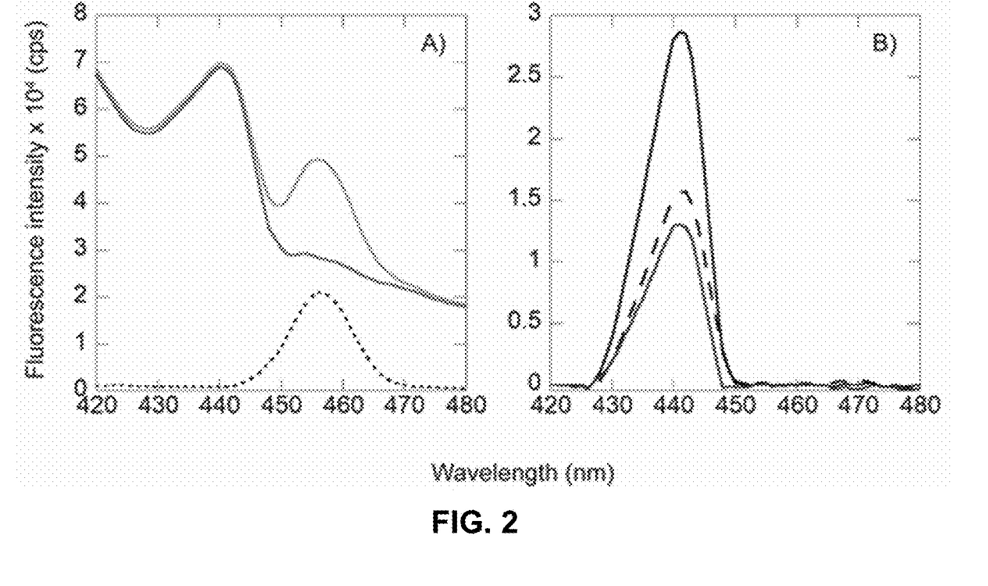

After incubation and sealing, the 3-CCA filled nanoreactors were purified multiple times using centrifugation and their dry form was irradiated with X-rays and then dissolved in water for fluorescence measurements. The solutions, together with the irradiated supernatants after each purification, were examined using fluorimetry. A typical raw data is shown in FIG. 2A (solid grey line). The spectrum contains the water Raman scattering peak around 456 nm (395 nm excitation), corresponding to a wavelength shift of 3400-3600 $cm^{-1}$, and at an intensity of $10^3$ to $10^4$ cps, depending on the solution. The water Raman scattering profile alone is shown in FIG. 2A as well (dotted line). The water scattering is more intense when mesoporous silica is dissolved in water. The peak at 440 nm is the fluorescence peak from 7-OHCCA. The spectrum from 7-OHCCA fluorescence after removing these backgrounds is shown (solid black line) in FIG. 2B, from which the signal without X-ray irradiation (black dashed line) is removed to produce the true fluorescent signal, which is given in FIG. 2B below the dashed line. All the data shown in this disclosure were processed using the same procedure.

Figure 3:
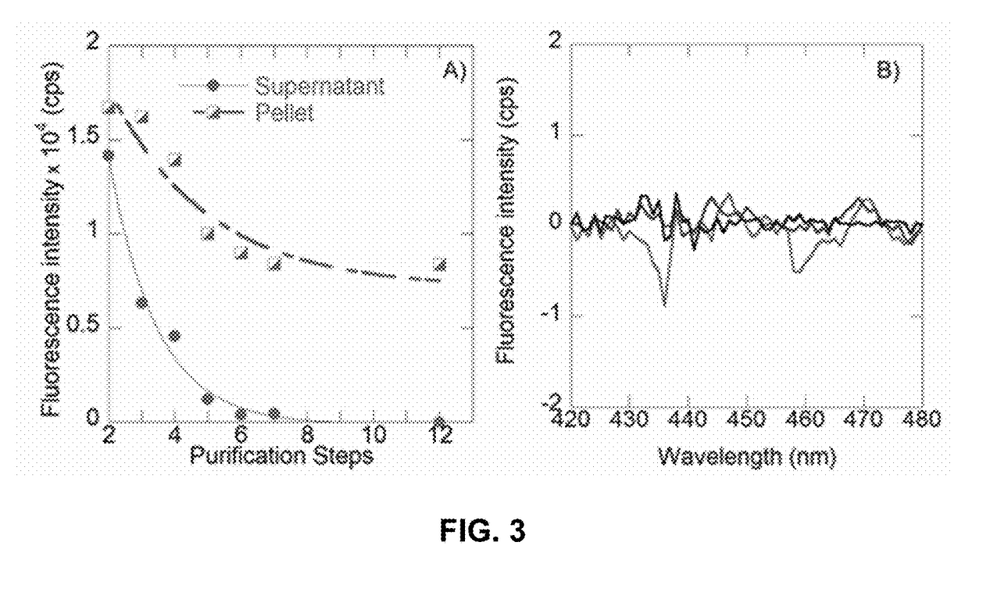
FIG. 3 illustrates the comparison of X-ray irradiated, 3-CCA (aq) filled nanoreactors and solid mesoporous silica nanoparticles.

The loading capacity of 3-CCA aqueous solutions in the nanoreactors was studied and the results are given in FIG. 3A. Two experiments were performed: one determining the amount of 7-OHCCA (after X-ray irradiation) in the nanoreactors, and the other showing the amount of 7-OHCCA in solid mesoporous silica particles (also sealed with amorphous silica). The comparison reveals, indirectly, the capacity of 3-CCA in the nanoreactors.

FIG. 3A shows the results of the fluorescence of 7-OHCCA in both the nanoreactors (shown in FIG. 1A (C)) and the supernatant solutions after purification of the nanoreactors. The signal of 7-OHCCA after X-ray irradiation in the supernatant decays quickly as a function of the number of centrifugal purifications. After six purifications, the signal decreases to below a level of noise. In contrast, the signal for the pellet or nanoreactors becomes nearly constant after six purifications, proving that 3-CCA molecules, or 7-OHCCA after X-ray irradiation, are securely stored inside the nanoreactors during the course of measurement.

The inventors have also tested the loading capacity of the mesoporous silica nanoparticles for 3-CCA. For this purpose, the solid mesoporous silica nanoparticles shown in FIG. 1A (A) were incubated with 3-CCA (aq) for 12 hours and then sealed with a layer of amorphous silica. The particles were then irradiated with X-rays and measured using the fluorimeter. The results are shown in FIG. 3B, which displays the signal increase for three irradiation cases of 100, 200, and 300 Gy. It is worth noting that the signal increase due to irradiation may be negligible, on the order of less than 1 cps, compared to $10^4$ cps from the nanoreactors. The water Raman scattering signal was higher in the mesoporous silica samples. However, there is little 7-OHCCA signal from these samples, as evidenced in FIG. 3B. The signals are the same for non-irradiated 3-CCA in particles as the irradiated samples, proving that there is little or no 7-OHCCA in the sealed mesoporous silica nanoparticles after X-ray irradiation.

These two experiments demonstrate that 3-CCA solutions are trapped inside the hollow cavity of the nanoreactors and upon X-ray irradiation, 3-CCA molecules efficiently react with hydroxyl radicals produced in the cavity to form fluorescent 7-OHCCA molecules. A more detailed calculation and comparison is provided below in the discussion section. The results also show that 3-CCA can diffuse into the cavity prior to sealing, which was not hindered by the presence of 3-CCA. These results illustrate that there is little 7-OHCCA in the mesoporous silica after X-ray irradiation, which suggests that either there is little 3-CCA in the solid mesoporous silica particles, or the mesoporous volume was too small to generate enough hydroxyl radicals to react with 3-OHCCA to form enough 7-OHCCA.

Figure 4:
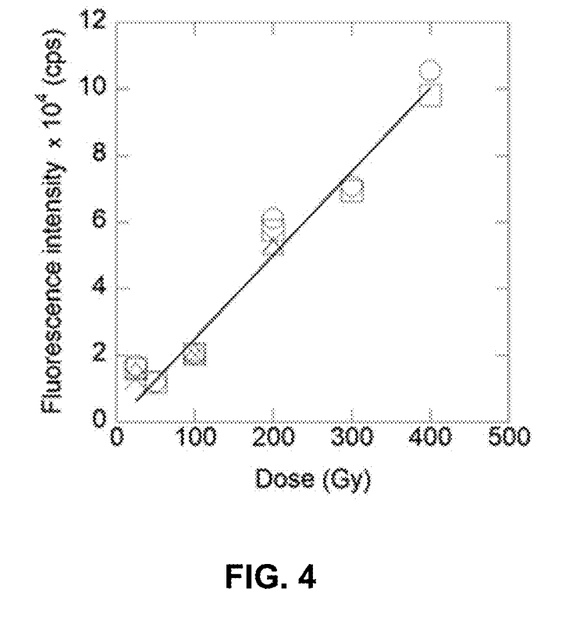
FIG. 4 illustrates the dose measurement results using 3-CCA (aq) stored in nanoreactors (dry form). The dose range shown here is between 10 and 400 Gy. The response is relatively linear (fit to Eq. y=0.025x; $R^2$=0.9736). The nanoreactors can be used in either dry form or in aqueous solutions.

After proving 3-CCA is securely stored in the aqueous solutions inside the nanoreactors, the nanoscale probes were irradiated at different X-ray doses to obtain the dynamic range of the probes with respect to the dose and to quantitatively estimate the amount of 3-CCA and 7-OHCCA (after irradiation) in each nanoreactor. FIG. 4 shows the dose dependency measurements. The highest dose used in the measurement was about 400 Gy. The lowest dose was 10 Gy, which may occur due to limitations of the sample size and detection sensitivity of the fluorimeter. A calculation of the amount of 3-CCA inside the shells/nanoreactors was performed and the results are shown below in Table 1. The dynamic range shown in FIG. 4 is slightly greater than one order of magnitude, and this range depends on many parameters including the amount of nanoreactors and fluorescence detection method and sensitivity.

Table 1 shows the calculated and measured 3-CCA and 7-OHCCA after 100 Gy irradiation. 3-CCA amounts are estimated from experimental procedures. If the purification after PVP coating removed 90% of the 3-CCA from the unsealed shells, then the 3-CCA concentration in the shells should be approximately 2 mM, which corresponds to 10,000 3-CCA molecules per nanoreactor. 7-OHCCA are calculated based on the assumption that all hydroxyl radicals are reacted with 3-CCA, and 20% of the products are 7-OHCCA.[3] There are approximately 30 7-OHCCA molecules per nanoreactor. The results suggest that 7-OHCCA formation is not affected by the nanoreactors, i.e., nanoreactors do not scavenge hydroxyl radicals under the current experimental condition. This suggests that the silica inner surface is relatively inert towards hydroxyl radicals. As dose increases, more hydroxyl radicals are produced and fewer 3-CCA molecules are available to react with hydroxyl radicals, and the response can be saturated or even decay, due to damage to 7-OHCCA by X-ray irradiation.[5] Based on Table 1, a maximum dose the current nanoreactors can detect is about 30 kGy, although a nonlinear response could occur at much lower dose, and thus the nanoreactors may detect a response at greater than, less than, or about 30 kGy, less than or about 20 kGy, less than or about 10 kGy, less than or about 1 kGy, between or about 10 Gy and about 1000 Gy, or at any other range encompassed within any of these stated ranges. In some embodiments, the range may change for different probing molecules. In practice, many parameters such as the number of 3-CCA in each nanoreactor and the size of nanoreactors can influence the linearity of response.

TABLE 1

Calculated and measured or estimated amounts of 3-CCA and 7-OHCCA in nanoreactors and in solution.

| | Free Molecules in Solution during Incubation | Molecules Concentration in Nanoreactors |
|---|---|---|
| 3-CCA | 20 mM | ~10,000 |
| Hydroxyl radicals (100 Gy) | — | ~150 |
| 7-OHCCA (100 Gy) | — | ~30 |

The inventors also performed numerical kinetic studies and the results indicate that in order to have a 400-Gy linear response dose, the amount of 3-CCA inside the nanoreactors (260 nm inner diameter) should be greater than 1700 or 0.3 mM. However, the actual number of 3-CCA may be higher, because this number is close to the 600 hydroxyl radicals produced in the nanoreactor after 400 Gy of X-ray irradiation.

Figure 5:
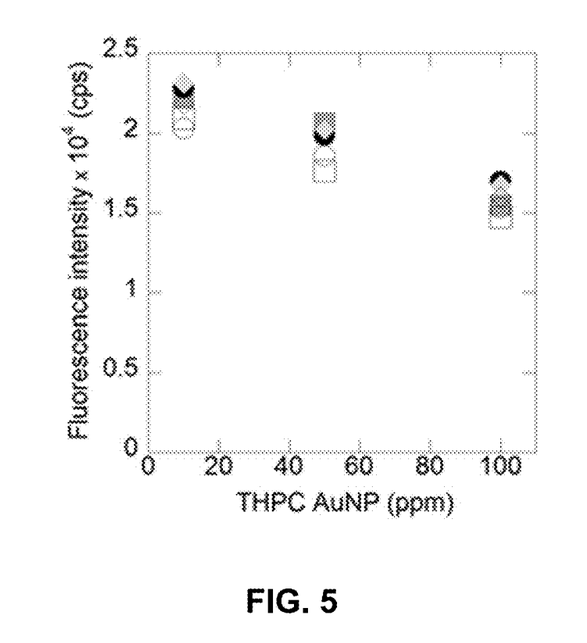
FIG. 5 illustrates the X-ray irradiation of 3-CCA (aq) filled nanoreactors irradiated with X-rays at different 3-nm THPC AuNP concentrations. For each concentration of THPC AuNPs, three nanoreactor samples were irradiated with AuNPs (empty diamond, square, and circle) and one was irradiated without AuNPs but spiked with the sample AuNPs after the nanoreactor sample was irradiated (solid circle). The results are statistically identical at each THPC AuNP concentration.

THPC AuNPs are known to possess catalytic properties towards chemical reactions involving X-ray generated species.[5] When dissolved in water with 3-CCA, 10-100 ppm THPC AuNPs were shown to indeed enhance the production of 7-OHCCA after X-ray irradiation, the results of which were repeated in this work but not illustrated. FIG. 5 shows the results of measurements of fluorescence intensity of 7-OHCCA as function of THPC-AuNP concentration when THPC AuNPs were added into the aqueous solutions of nanoreactors. Moderate reduction of signal was observed, regardless of whether AuNPs were added before or after X-ray irradiation, indicating that there is no influence from the AuNPs. The decrease in fluorescence signal from 7-OHCCA may be due to attenuation of the detected light by AuNPs; as more AuNPs were added, there was more attenuation and less fluorescence signal was detected. This again demonstrates that the sealed nanoreactors successfully separated 7-OHCCA aqueous solutions from the external chemical environment.

Figure 6:
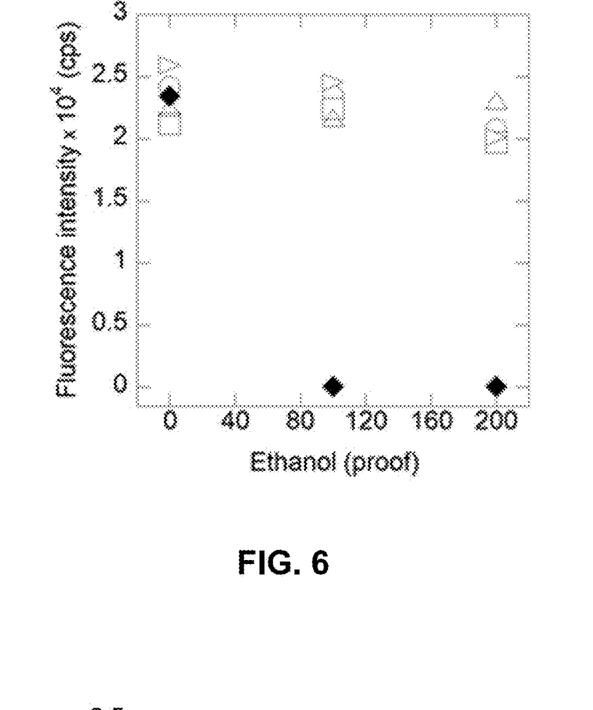
FIG. 6 illustrates X-ray irradiated 3-CCA solutions with different concentrations of ethanol (black diamond) and the same measurements using sealed nanoreactors filled with 3-CCA (empty symbols). In total, four nanoreactor samples were irradiated at each ethanol concentration. The results show little change to 3-CCA response to X-ray irradiation when the molecules are trapped in the sealed nanoreactors.

The nanoreactors may be chemically sealed with the solid amorphous layer. The seal may be complete and liquid tight, which can be further proven by adding scavengers into aqueous solutions of nanoreactors filled with 3-CCA. FIG. 6 shows the results of scavenging tests with added ethanol. After ethanol (100 and 200 proof) was added to the 3-CCA aqueous solution, the 7-OHCCA signal was changed from $2.3 \times 10^4$ cps to almost zero (solid black diamond). After ethanol was added to aqueous solutions of the nanoreactors (empty symbols), there was little change to the fluorescent signals, proving that shells were completely sealed with respect to small molecules such as ethanol and nearly same amounts of 7-OHCCA were produced in the nanoreactors. Scavenger experiments thus further confirm the tightness of the sealing.

Core-shell ($mSiO_2@mSiO_2$) cubic particles were fabricated using the solid cubic $mSiO_2$ particles shown in FIG. 1B (A) as the template for the deposition of the second $mSiO_2$ layer. It is claimed that an external $mSiO_2$ layer can form on the core because of residual CTAB molecules that penetrate away from the porous channels.[23] FIG. 1B (B) shows a TEM image of the core-shell structure, exhibiting a higher contrast for the exterior layer than the core of the core-shell $mSiO_2@mSiO_2$, which suggests the core and shell mesoporous silica have different porosities and densities, with the density of the outer shell silica being higher than the inner core silica. This is different from other methods of making large spherical $mSiO_2$ particles, which do not have this distinct outer shell.

Hollow $mSiO_2$ ($hmSiO_2$) cubic particles were created by thermally treating $mSiO_2@mSiO_2$ cubes dispersed in water. The hollowing process was attained through selective etching supported by structural differences. FIGS. 1B (C) through 1B (E) display $hmSiO_2$ cubic particles with hollow interiors and three different shell thicknesses. $mSiO_2$ with 75, 60 and 100 nm thick shells were produced using 100, 50 and 1000 µL TEOS, respectively. The cores of $mSiO_2@mSiO_2$ are removed after the etching reaction as depicted in FIGS. 1B (C), 1B (D), and 1B (E). In contrast, FIG. 1B (F) shows partial etching of the cubes without the outer $mSiO_2$ shell, indicating the cubic cores are made of an aggregation of particles without any clear channeling. These results, as shown in FIG. 1B (D) and 1B (E), clearly illustrate the growth mechanism of the cubic $mSiO_2$ cores, which is through the aggregation of small silica-coated CTAB micelles without forming channeled mesoporous silica.

The cubic shells can also host nanomaterial solutions in their cavities. FIG. 1C shows the results of the synthesis of large gold nanoparticles (AuNPs) in the cubic shells from small AuNP seeds. FIG. 1C (A) shows a TEM image of large AuNPs grown from small AuNP seeds using an established method.[24] The average size of the small AuNPs is $(7 \pm 1.4)$ nm and the large AuNPs are $(108 \pm 10)$ nm. This synthesis of the AuNPs shown in FIG. 1C (A) occurred using the seeded growth without the shells in the solution. When the AuNP seeds were incubated with the cubic shells, large AuNPs were synthesized as well, albeit the size was smaller than that of AuNPs synthesized without the shells. The small AuNPs are visible in the cubic shells, as shown in the circles in FIG. 1C (B). After the seeded growth, large AuNPs appear in the inside of the shells. FIGS. 1C (C), 1C (D), and 1C (E) show the large AuNPs in the shells and no large AuNPs are seen outside of the shells, clearly demonstrating that all the AuNPs are inside the nanoreactors. The shells synthesized under the stated conditions could be controlled to different thicknesses, from about 60 nm to about 100 nm. These shells may be used as nanoreactors to trap X-ray dosimetric molecules such as 3-CCA or to host synthesis of large, gold nanoparticles from small, less gold nanoparticle seeds that could enter the shells through their pores.

The gold nanoparticle seeds may be characterized by diameters of less than or about 10 nm, less than or about 9 nm, less than or about 8 nm, less than or about 7 nm, less than or about 6 nm, less than or about 5 nm, less than or about 4 nm, less than or about 3 nm, or less. The large, gold nanoparticles could be formed to diameters of greater than or about 50 nm, greater than or about 60 nm, greater than or about 70 nm, greater than or about 80 nm, greater than or about 90 nm, greater than or about 100 nm, greater than or about 110 nm, greater than or about 120 nm, greater than or about 130 nm, greater than or about 140 nm, greater than or about 150 nm, or greater. The pores formed within the shells could be characterized by diameters of greater than or about 5 nm, greater than or about 6 nm, greater than or about 7 nm, greater than or about 8 nm, greater than or about 9 nm, greater than or about 10 nm, greater than or about 11 nm, greater than or about 12 nm, greater than or about 13 nm, greater than or about 14 nm, greater than or about 15 nm, or greater, as well as than or about any of these stated values.

Figure 1D:
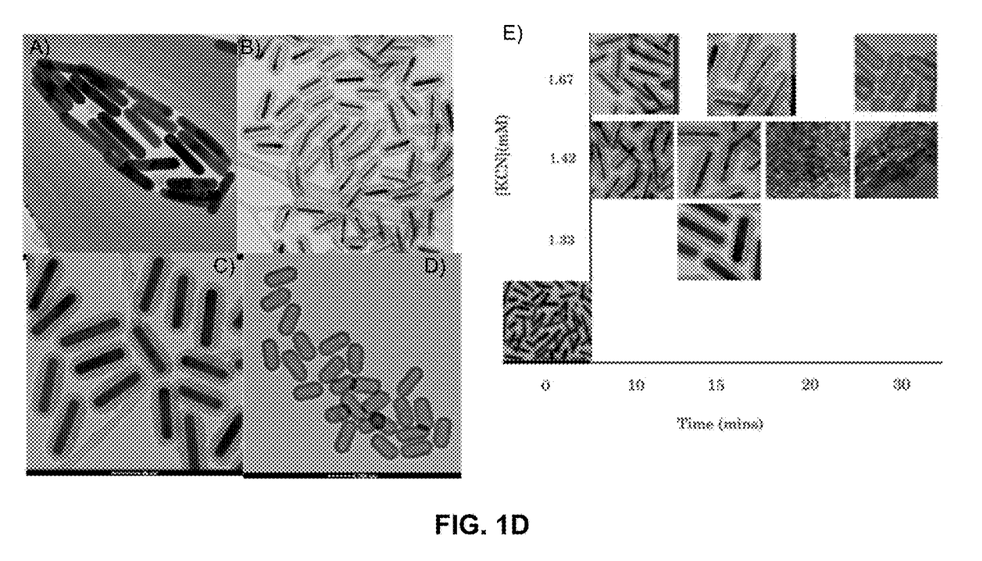
FIG. 1D illustrates TEM images of the synthesis of cylindrical nanoreactors.

The methods for producing cylindrical shells, which may be similarly used for other geometries facilitated the development of unique nanostructure cores. FIG. 1D shows the results of different stages of nanoreactor development. FIG. 1D (A) shows formed gold nanorods. FIG. 1D (B) shows nanorods having porous silica shells. FIG. 1D (C) shows partially etched gold nanorods within the silica shells, and FIG. 1D (D) shows cylindrical formed silica nanoreactors according to some embodiments of the present technology. FIG. 1D (E) shows the effect of treatment conditions on the gold nanorods. For example, by adjusting etchant concentration and/or time, a variety of unique gold nanoparticles may be developed from partially etched rods, to residual particles, to formed silica nanoshell nanoreactors.

The results shown above demonstrate that 3-CCA molecules and gold particles are securely stored in the nanoparticles during the course of measurements, which occurred over many hours. The nanoreactors therefore may allow studying of several important processes, including the differentiation of chemical enhancement from other enhancements. This also proves that the shells, even if they could be leaking, are relatively tight and do not allow high concentrations of scavengers outside to diffuse into the shells.

Figure 7:
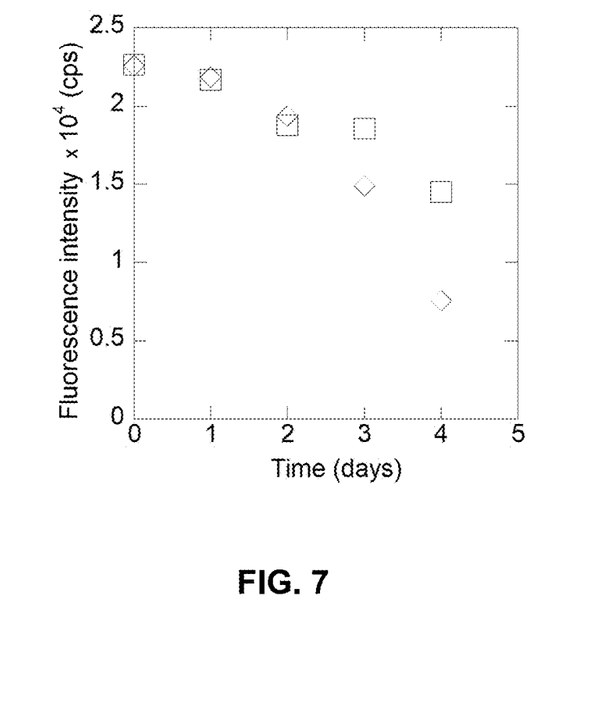
FIG. 7 illustrates X-ray irradiated 3-CCA-filled dried nanoreactors (squares) dissolved in water after spending different amounts of time in water (diamonds). The nanoreactors remain sealed for at least a day in water, and can be used within 3-4 days of synthesis.
Figure 8:
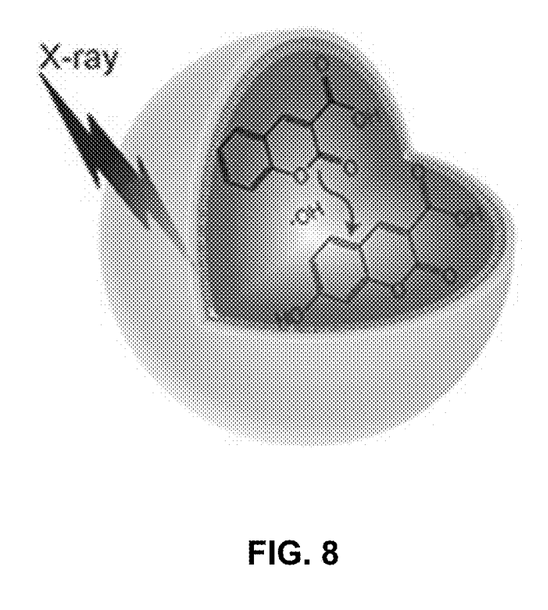
FIG. 8 illustrates a synopsis of the transition of 3-CCA dissolved in water in nanoreactors into 7-OHCCA as a response to X-ray irradiation.

In addition, the shelf lifetime of 3-CCA in the dry nanoreactors and nanoreactors dissolved in water was also studied. The results are shown in FIG. 7. Fluorescence measurements of 7-OHCCA obtained after irradiation of 3-CCA filled nanoreactors dissolved in water show significant decay over four days, which could be caused by incomplete sealing of the amorphous silica layer. The fluorescence in the dried nanoreactors was stronger after a similar number of days. In both samples, the seal may be adequate to prevent 3-CCA from leaking out for at least a day. Future study on sealing may be performed when longer lifetime in water is necessary for these or other nanoreactors.

Discussion

The results shown here demonstrate that 3-CCA molecules are dissolved in an aqueous solution trapped in the nanoreactors, and these 3-CCA molecules can react with hydroxyl radicals similar to the reactions of free 3-CCA in water under X-ray irradiation. The nanoreactors are sealed for at least a day, and there is no exchange between the inside solutions and chemicals outside during this time.

The sealed nanoreactor also means that there is an upper limit of the amount of 3-CCA in each nanoreactors that can respond to X-ray irradiation and react with the hydroxyl radicals produced from irradiation. As Table 1 indicates, there are approximately 10,000 3-CCA per 260 nm (inner diameter) nanoreactor, which correlates to 2 mM of 3-CCA. Given the G values of hydroxyl radicals to be 0.027 mM per 100 Gy of 40 keV X-ray irradiation of water, a 10-kGy irradiation would exhaust all the 3-CCA molecules. However, the measurement would deviate from linearity at far below this dose. Based on the statistics, the amount of hydroxyl radicals should be below 10% of the amount of 3-CCA to maintain approximately linearity, and to be below 2% if high linearity is to be followed. This estimation agrees with the measured linearity dose range. At 400 Gy, the percentage of 3-CCA reacted with hydroxyl radicals is 1.5%.

As stated in the results section, the lower limit of the detected dose may be partially determined by the detection sensitivity and partially the sample size. When a large enough amount of sample is available, and the detection is sensitive, much lower doses can be detected. Even if there are below one 7-OHCCA molecule per nanoreactors, if the sensitivity is high enough and if there is enough sample, then the dose response can be detected. Present testing is exploring the lower limit of detecting fluorescence from 7-OHCCA from these nanoreactors.

The nanoreactors have been shown to respond to X-ray irradiation and the results can be detected with a regular fluorimeter. In contrast, when the mesoporous silica is not etched to form cavities in the middle, no 7-OHCCA was detected. As shown by others that molecules are trapped in solid mesoporous silica particles, this result proves that the cavity is critical for the dosimetric 3-CCA to 7-OHCCA conversion reactions to occur. This proves that the sum of small volumes in solid mesoporous silica is much less effective than a large, equal volume. The mesoporosity, in other words, significantly reduces the effective volume of water in which X-rays can generate hydroxyl radicals. This can be phenomenologically understood as the increased surface area of silica as the volume of water is increasingly divided into smaller partitions. Although silica is not very scavenging of hydroxyl radicals, it may still scavenge hydroxyl radicals to some degree.[5, 25] As a result, these two factors render the production of 7-OHCCA in solid mesoporous silica minimal, as shown in FIG. 3B.

Given the strong response of these nanoreactors to X-ray irradiation, an immediate application is to probe local energy deposition from other nanostructures such as large gold nanoparticles under X-ray irradiation.[7] The profile of energy deposition surrounding these nanoparticles can be measured with the nanoreactors without being subjected to interference from other reagents including gold nanoparticle catalysts. If 3-CCA is not stored in the nanoreactors, then 3-CCA interacting with the surface of gold and the reaction to form 7-OHCCA is catalytically influenced; a process called chemical enhancement.[5] These nanoreactors can hence be used in solution and even in biological cells to fiducially determine dose enhancement factors.

Once calibrated with the probes inside, these nanoreactors can be used to determine the absolute dose as well as the relative dose enhancement. The absolute dose range may be within the allowable range of the specific nanoreactors, and the exact range of linear dose response may be dependent on the size of the nanoreactors, the nature and concentration of the probes, as well as the content in the nanoreactors. The nanoreactors may also allow measurement of true X-ray dosage in the presence of nanoparticle catalysts or scavengers, and may allow measurements of certain dose enhancement factors such as Type I physical enhancement, Type II physical enhancement, or chemical enhancement.

Another advantage of the present technology is that the nanoreactors can be used in dry form or in the matrices of other materials such as gold nanoparticles or polymer. The probes may be changed for different purposes of detection. Variations of the nanoreactors can be developed to withstand high temperature environments and other conditions. Additionally, a number of different geometries may be developed according to embodiments of the present technology

REFERENCES

1. Guo, T., X-Ray *Nanochemistry: Concepts and Development*; Springer International Publishing: New York, NY, 2018, p XXI, 513.
2. Manevich, Y.; Held, K. D.; Biaglow, J. E., Coumarin-3-Carboxylic Acid as a Detector for Hydroxyl Radicals Generated Chemically and by Gamma Radiation. *Radiation Research* 1997, 148, 580-591.
3. Louit, G.; Foley, S.; Cabillic, J.; Coffigny, H.; Taran, F.; Valleix, A.; Renault, J. P.; Pin, S., The Reaction of Coumarin with the Oh Radical Revisited: Hydroxylation Product Analysis Determined by Fluorescence and Chromatography. *Radiation Physics and Chemistry* 2005, 72, 119-124.
4. Misawa, M.; Takahashi, J., Generation of Reactive Oxygen Species Induced by Gold Nanoparticles under X-Ray and Uv Irradiations. *Nanomedicine-Nanotechnology Biology and Medicine* 2011, 7, 604-614.
5. Cheng, N. N.; Starkewolf, Z.; Davidson, A. R.; Sharmah, A.; Lee, C.; Lien, J.; Guo, T., Chemical Enhancement by Nanomaterials under X-Ray Irradiation. *J. Am. Chem. Soc. Commun.* 2012, 134, 1950-1953.
6. Carter, J. D.; Cheng, N. N.; Qu, Y. Q.; Suarez, G. D.; Guo, T., Nanoscale Energy Deposition by X-Ray Absorbing Nanostructures. *J. Phys. Chem. B* 2007, 111, 11622-11625.
7. Lee, C.; Cheng, N. N.; Davidson, R. A.; Guo, T., Geometry Enhancement of Nanoscale Energy Deposition by X-Rays. *J. Phys. Chem. C* 2012, 116, 11292-11297.
8. Sharmah, A.; Yao, Z.; Lu, L.; Guo, T., X-Ray-Induced Energy Transfer between Nanomaterials under X-Ray Irradiation. *Journal of Physical Chemistry C* 2016, 120, 3054-3060.
9. Gilles, M.; Brun, E.; Sicard-Roselli, C., Quantification of Hydroxyl Radicals and Solvated Electrons Produced by Irradiated Gold Nanoparticles Suggests a Crucial Role of Interfacial Water. *Journal of Colloid and Interface Science* 2018, 525, 31-38.
10. Dong, B.; Pei, Y. C.; Zhao, F.; Goh, T. W.; Qi, Z. Y.; Xiao, C. X.; Chen, K. C.; Huang, W. Y.; Fang, N., In Situ Quantitative Single-Molecule Study of Dynamic Catalytic Processes in Nanoconfinement. *Nat Catal* 2018, 1, 135-140.
11. Zhang, W. H.; Hu, X. X.; Zhang, X. B., Dye-Doped Fluorescent Silica Nanoparticles for Live Cell and in Vivo Bioimaging. *Nanomaterials-Basel* 2016, 6.
12. Sharmah, A.; Zi, Y.; M., S.; Guo, T., Probing Dynamics of Nanoparticles with Exclusive Nanoscale Physical Enhancement by Nanomaterials under X-Ray Irradiation. *J. Phys. Chem. C* 2015, Submitted.
13. Wang, L. P.; Titov, A.; McGibbon, R.; Liu, F.; Pande, V. S.; Martinez, T. J., Discovering Chemistry with an Ab Initio Nanoreactor. *Nat Chem* 2014, 6, 1044-1048.
14. Petrosko, S. H.; Johnson, R.; White, H.; Mirkin, C. A., Nanoreactors: Small Spaces, Big Implications in Chemistry. *J Am Chem Soc* 2016, 138, 7443-7445.
15. Teng, Z. G.; Su, X. D.; Zheng, Y. Y.; Sun, J.; Chen, G. T.; Tian, C. C.; Wang, J. D.; Li, H.; Zhao, Y. N.; Lu, G. M., Mesoporous Silica Hollow Spheres with Ordered Radial Mesochannels by a Spontaneous Self-Transformation Approach. *Chem Mater* 2013, 25, 98-105.
16. Gao, Y.; Chen, Y.; Ji, X. F.; He, X. Y.; Yin, Q.; Zhang, Z. W.; Shi, J. L.; Li, Y. P., Controlled Intracellular Release of Doxorubicin in Multidrug-Resistant Cancer Cells by Tuning the Shell-Pore Sizes of Mesoporous Silica Nanoparticles. *Acs Nano* 2011, 5, 9788-9798.
17. Du, B. Y.; Cao, Z.; Li, Z. B.; Mei, A. X.; Zhang, X. H.; Nie, J. J.; Xu, J. T.; Fan, Z. Q., One-Pot Preparation of Hollow Silica Spheres by Using Thermosensitive Poly (N-Isopropylacrylamide) as a Reversible Template. *Langmuir* 2009, 25, 12367-12373.
18. Fang, X. L.; Chen, C.; Liu, Z. H.; Liu, P. X.; Zheng, N. F., A Cationic Surfactant Assisted Selective Etching Strategy to Hollow Mesoporous Silica Spheres. *Nanoscale* 2011, 3, 1632-1639.
19. Davidson, R. A.; Guo, T., An Example of X-Ray Nanochemistry: Sers Investigation of Polymerization Enhanced by Nanostructures under X-Ray Irradiation. *Journal of Physical Chemistry Letters* 2012, 3, 3271-3275.
20. Stober, W.; Fink, A.; Bohn, E., Controlled Growth of Monodisperse Silica Spheres in Micron Size Range. *J Colloid Interf Sci* 1968, 26 (1), 62-&.
21. Choi, E.; Kwak, M.; Jang, B.; Piao, Y., Highly monodisperse rattle-structured nanomaterials with gold nanorod core-mesoporous silica shell as drug delivery vehicles and nanoreactors. *Nanoscale* 2013, 5 (1), 151-154.
22. Ye, X.; Zheng, C.; Chen, J.; Gao, Y.; Murray, C., Using binary surfactant mixtures to simultaneously improve the dimensional tunability and monodispersity in the seeded growth of gold nanorods. *Nano Lett.* 2013, 13, 765-771
23. Yildirim, A.; Bayindir, M., A porosity difference based selective dissolution strategy to prepare shape-tailored hollow mesoporous silica nanoparticles. J Mater Chem A 2015, 3 (7), 3839-3846.
24. Davidson, R. A.; Guo, T., Average Physical Enhancement by Nanomaterials under X-ray Irradiation. *J Phys Chem C* 2014, 118 (51), 30221-30228.
25. Morry, J.; Ngamcherdtrakul, W.; Yantasee, W., Oxidative Stress in Cancer and Fibrosis: Opportunity for Therapeutic Intervention with Antioxidant Compounds, Enzymes, and Nanoparticles. *Redox Biol* 2017, 11, 240-253.

What is claimed is:

1. A method of measuring radiation dosage, the method comprising:
   incorporating a probing molecule within a nanoreactor;
   irradiating the nanoreactor with irradiation energy for a period of time sufficient for the probing molecule to react with hydroxyl radicals to form a fluorescent molecule; and
   measuring a dosage of irradiation based on the fluorescent molecules formed, wherein the dosage measurements are substantially linearly responsive within a dose range.

2. The method of claim 1, wherein the dose range is from below or about 10 Gy to above or about 500 Gy.

3. The method of claim 1, wherein the probing molecule comprises coumarin 3-carboxylic acid.

4. The method of claim 1, wherein the nanoreactor comprises a hollow mesoporous silica shell characterized by a shell geometry that is substantially spherical, substantially cubic, or substantially cylindrical.

5. The method of claim 4, wherein the probing molecule is incorporated with water within the hollow mesoporous silica shell.

6. The method of claim 5, wherein hollow mesoporous silica shell comprises an exterior coating comprising polyvinylpyrrolidone.

7. The method of claim 5, wherein hollow mesoporous silica shell comprises an exterior coating comprising amorphous silica.

8. The method of claim 7, wherein the amorphous silica seals over 90% of pores of the hollow mesoporous silica shell.

9. The method of claim 1, wherein the irradiating is performed in an environment comprising gold nanoparticles.

10. The method of claim 1, wherein the irradiating is performed in an environment comprising hydroxyl radical scavengers.

11. The method of claim 10, wherein the nanoreactor substantially seals an interior of the nanoreactor from the environment comprising the hydroxyl radical scavengers.

12. A method of producing a nanoreactor configured to measure irradiation dosage, the method comprising:
   incorporating probing molecules within a hollow mesoporous nanoreactor; and
   mixing a water-soluble polymer with the hollow mesoporous nanoreactor subsequent sufficient time for probing molecules to be contained within the hollow mesoporous nanoreactor, wherein the water-soluble polymer is configured to substantially seal pores of the hollow mesoporous nanoreactor.

13. The method of claim 12, wherein the hollow mesoporous nanoreactor comprises silica.

14. The method of claim 12, wherein the probing molecules comprises coumarin 3-carboxylic acid.

15. The method of claim 12, wherein the water-soluble polymer comprises polyvinylpyrrolidone.

16. The method of claim 12, wherein the water-soluble polymer is mixed with the hollow mesoporous nanoreactor after at least about 4 hours from incorporating the probing molecules with the hollow mesoporous nanoreactor.

17. The method of claim 12, wherein the water-soluble polymer seals more than 99% of the pores of the hollow mesoporous nanoreactor.

18. A nanoreactor comprising:
   a hollow mesoporous shell;
   an aqueous solution contained within the hollow mesoporous shell, wherein the aqueous solution comprises a plurality of probing molecules; and
   an external coating on the hollow mesoporous shell comprising a polymeric material.

19. The nanoreactor of claim 18, wherein the hollow mesoporous shell comprises silica.

20. The nanoreactor of claim 18, wherein the external coating comprises amorphous silica and polyvinylpyrrolidone.

* * * * *